3,157,651
TRIAZINE COMPOUNDS
John Reginald Atkinson and Sidney Hartley, Manchester, England, assignors to Imperial Chemical Industries Limited, London, England, a corporation of Great Britain
No Drawing. Filed Nov. 30, 1962, Ser. No. 241,171
Claims priority, application Great Britain, Dec. 4, 1961, 43,243/61
6 Claims. (Cl. 260—248)

This invention relates to new triazine compounds, more particularly compounds carrying certain polycyclic aryl substituents, and the use of these compounds as fluorescent brightening agents.

2:4-dichloro-1:3:5-triazines carrying in the 6 position a polycyclic aryl nucleus are obtained by the interaction of cyanuric chloride with the appropriate polycyclic aromatic compound in presence of a catalyst such as aluminum chloride. We have now found that these 2:4-dichlorotriazines may be interacted with compounds containing active hydrogen atoms, for example amines, alcohols and mercaptans, to give triazine compounds in which one or both chlorines have been replaced by, for example, substituted amino groups, alkoxy groups or alkylthio groups, which triazine compounds are of value as fluorescent brightening agents in textile materials.

According to our invention therefore there are provided new triazine compounds of the formula:

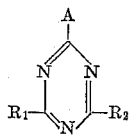

wherein A stands for a polycyclic aromatic group containing at least three condensed rings and $R_1$ stands for a chloro, substituted amino, alkoxy, substituted alkoxy, aryloxy, alkylthio, or substituted alkylthio group, and $R_2$ stands for a substituted amino, alkoxy, substituted alkoxy, aryloxy, alkylthio or substituted alkylthio group.

As polycyclic aromatic groups there may be mentioned in particular pyrene, anthracene, acenaphthene and chrysene, which may optionally carry non-chromophoric substituents.

As substituted amino groups there may be mentioned arylamino groups such as phenylamino the phenyl nucleus of which may carry one or more substituents such as methyl, sulphonic acid, carboxylic acid or other non-chromophoric groups, and of which the hydrogen atom attached to the nitrogen may be replaced by a lower alkyl or substituted alkyl group, for example methyl, ethyl, or hydroxyethyl, alkylamino groups such as methylamino, dimethylamino, ethylamino, diethylamino, n-butylamino or di-isobutylamino, or substituted alkylamino groups such as β-hydroxyethylamino, bis(β-hydroxyethyl)amino, p-acetoxyethylamino, or hydroxypropylamino.

As alkoxy groups there may be mentioned methoxy, ethoxy and as substituted alkoxy groups there may be mentioned β-hydroxyethoxy groups. Aryloxy groups include phenoxy and cresoxy groups. As alkylthio groups there may be mentioned methylmercapto and as substituted alkylthio groups carboxymethylmercapto.

Those compounds wherein $R_1$ is chloro or substituted amino and $R_2$ is substituted amino may be obtained from the corresponding dichlorotriazines by heating with the corresponding amines, if desired in a solvent such as water or acetone, at a temperature suitably between 50 and 100° C. although temperatures outside this range can be used. An acid binding agent, which may be an excess of the amine, should be used. By use of two or more equivalents of amine, compounds in which $R_1$ and $R_2$ both stand for substituted amino groups are obtained. Use of substantially one molecular proportion of amine leads mainly to compounds in which $R_1$ stands for a chloro group and $R_2$ substituted amino group.

Compounds in which $R_1$ and $R_2$ stand for alkoxy or substituted alkoxy groups may be obtained by heating the dichlorotriazine with the sodium derivative of the appropriate alcohol, preferably using excess of the alcohol as solvent, at a temperature conveniently between 50 and 100° C. although temperatures outside this range can be used.

Water soluble compounds can be obtained for example by condensing the dichlorotriazine with an arylaminosulphonic acid, such as sulphanilic acid or alternatively by condensing the dichlorotriazine with for example monoethanolamine, and sulphonating the product. Instead of sulphonating the latter condensation product, its properties can be modified, for example by acetylation of the hydroxyl groups.

According to a further feature of our invention there is provided a process for the whitening of polymeric materials by the incorporation into the said polymeric material of a triazine compound of the formula:

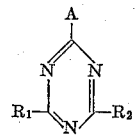

wherein A, $R_1$ and $R_2$ have the significances given earlier.

Polymeric materials which may be whitened by the process of the invention include synthetic polymeric materials, for example polyamides such as nylon, polyesters such as polyethylene terephthalate, polyurethanes, polyacrylonitrile and hydrolysed polyacrylonitriles, polymethyl methacrylate, polystyrene, polyethylene, polypropylene, artificial polymers for example secondary cellulose acetate, cellulose triacetate and regenerated cellulose such as viscose, and natural polymers for example cellulose such as cotton and paper, silk and wool.

The preferred method of incorporating the triazine compounds of the invention into the polymeric material is by treating the polymeric material with an aqueous suspension of the triazine compound at a temperature between 60° C. and 100° C. and preferably at a temperature between 95° C. and 100° C. Subject to any limitation imposed by the heat stability of the polymeric material higher temperatures, for example above 100° C. under super-atmospheric pressure if necessary, may, however, be used if desired. The aqueous medium is preferably substantially neutral, but acid or alkaline conditions may be employed if the textile material is resistant to these.

Another method for application, of particular value with synthetic polymeric materials such as polyethylene terephthalate, is to impregnate the fabric with an aqueous suspension of the triazine compound by padding preferably at room temperature and then dry the fabric by heating in air at a temperature between 150 and 200° C. and preferably about 180° C. for a short period, preferably between 20 and 30 seconds.

Surface active agents, for example fatty alcohol ethylene oxide condensates or sulphonated alkylnaphthalenes may be added with advantage, and it is in many cases convenient to disperse the triazine compound in a soap or detergent, which is then used to wash and whiten simultaneously the textile material from an aqueous medium. The incorporation of these compounds in soaps or detergents also improves the appearance of the soaps or detergents and this constitutes a further feature of the invention.

The triazine compounds may be used in conjunction with other whitening agents, for example substituted 4:4' - ditriazinylaminostilbene - 2:2' - disulphonic acids, in order to increase the whitening effect on certain textile materials, for example cotton, wool and polyesters such as polyethylene terephthalate.

The use of substantially neutral aqueous suspensions in the process of the invention permits these whitening agents to be applied to textile materials at the same time as dispersed dyestuffs thus providing dyeings of brighter shade.

Other methods of incorporating the triazine compounds in the process of the invention may be used if desired. The triazine compounds may for example be mixed with the polymer in molten or plasticised form. Alternatively if the triazine compound is in the form of a water-soluble derivative, for example a sulphonic acid salt, it may be applied from aqueous solution in the conventional manner.

The invention is illustrated but not limited by the following examples in which the parts and percentages are by weight unless otherwise specified.

*Example 1*

A mixture of 10.5 parts of (2:4-dichloro-1:3:5-triazin-6-yl)pyrene and 60 parts of monoethanolamine are stirred at 100° C. for 4 hours. The mixture is then poured into 500 parts of cold water and the precipitated product is filtered and washed with cold water until free from monoethanolamine. After drying it is purified by recrystallisation from butanol to give 6 parts of [2:4-di-(β-hydroxyethylamino)-1:3:5-triazin-6-yl]pyrene as a lemon yellow crystalline powder melting between 177 and 182° C.

1 part of the [2:4-di-(β-hydroxyethylamino)-1:3:5-triazin-6-yl]pyrene is milled with 100 parts of water in presence of 0.2 part of the sodium salt of an alkylated naphthalene sulphonic acid for 16 hours. 10 parts of the suspension so obtained are diluted with 40 parts of water and heated to 85° C. 1 part of nylon fabric is added to this hot suspension and the temperature is then raised slowly to 100° C. and kept at this temperature for one hour. After rinsing and drying the nylon is much whiter with a slightly greenish-blue tone than untreated nylon.

1 part of secondary cellulose acetate fabric is similarly treated with 40 parts of an aqueous suspension containing 0.2 part of [2:4-di-(β-hydroxyethylamino)-1:3:5-triazin-6-yl]pyrene at 85° C. for 45 minutes. A much brighter white of a bluish tone is given to the material.

The experiment above using secondary cellulose acetate is repeated using cellulose triacetate. The material becomes much whiter with a reddish-blue tone than untreated material.

1 part of polyacrylonitrile fabric is treated with 30 parts of an aqueous suspension containing 0.2 part of [2:4 - di - (β-hydroxyethylamino)1:3:5-triazin-6-yl]pyrene at 100° C. for 90 minutes. The fabric is much improved in whiteness.

The (2:4-dichloro-1:3:5-triazin-6-yl)pyrene used above is obtained as follows:

20.2 parts of pyrene and 18.2 parts of cyanuric chloride are dissolved in 350 parts of benzene and while stirring at a temperature between 20 and 25° C., 20 parts of anhydrous aluminium chloride are added over 1 hour after which stirring is continued at between 20 and 25° C. for 12 hours.

The dark coloured condensation mixture is poured into 350 parts of methanol and after stirring for 10 minutes it is filtered and washed on the filter with more methanol. The solid is stirred with 250 parts of water and 25 parts of 36% aqueous hydrochloric acid at a temperature between 0 and 5° C. for 15 minutes, filtered again and washed on the filter with ice-cold water until acid-free. It is finally washed with 100 parts of methanol and then dried at a temperature not exceeding 80° C. The product is 31 parts of a bright yellow powder of M.P. 253° C. which can be recrystallised from o-dichlorobenzene to give golden yellow leaflets of M.P. 257° C.

*Example 2*

17.5 parts of (2:4-dichloro-1:3:5-triazin-6-yl)pyrene are stirred with 200 parts of acetone and heated to boiling. To the boiling mixture is added over 1 hour a solution of 6.1 parts of monoethanolamine in 25 parts of acetone after which boiling is continued for a further hour. The solution is filtered from unchanged (2:4-dichloro-1:3:5-triazin-6-yl)pyrene and the filtrate evaporated down to dryness in a water bath leaving a viscous oil which is digested with 250 parts of cold water giving a yellow solid which is filtered and purified by trituration with carbon tetrachloride. It is finally dried at a temperature not higher than 50° C. 14 parts of 2-chloro-4-(β-hydroxyethylamino - 1:3:5-triazin-6-yl)pyrene, a greenish-yellow powder, are obtained. This material may be used as a whitening agent on fabrics by the methods described in Example 1.

*Example 3*

20 parts of (2:4-dichloro-1:3:5-triazin-6-yl)pyrene and 50 parts of diethanolamine are stirred and heated for 6 hours at 100° C. The mixture is poured into 250 parts of cold water and the precipitated product filtered and washed well with cold water. It is now stirred for 1 hour at room temperature with 500 parts of water and 100 parts of 36% aqueous hydrochloric acid, filtered again and washed on the filter with cold water. The solid is stirred at room temperature with 250 parts of cold water made alkaline to Brilliant Yellow with sodium carbonate and again filtered. It is washed well with cold water and finally dried in a vacuum desiccator over calcium chloride. 26 parts of [2:4-di{di(β-hydroxyethyl)-amino{1:3:5-triazin-6-yl]pyrene, a canary yellow powder, are obtained. Similar results to those described in Example 1 are obtained when using this compound as a whitening agent.

*Example 4*

A mixture of 35 parts of (2:4-dichloro-1:3:5-triazin-6-yl)pyrene, 62 parts of a 72.5% aqueous solution of monoethylamine and 250 parts of acetone is stirred and boiled under reflux for 15 hours. The product is filtered and the solid well washed with cold water and dried. It is recrystallised from toluene to give 8 parts of [2:4-di(ethylamino)-1:3:5-triazin-6-yl]pyrene as a white crystalline powder melting between 222 and 223° C. Similar results to those described in Example 1 are obtained when using this compound as a whitening agent.

*Example 5*

35 parts of (2:4-dichloro-1:3:5-triazin-6-yl)pyrene are stirred with 250 parts of acetone and heated to boiling. To the boiling solution is added over 1 hour a solution of 9 parts of monoethylamine in 18 parts of water and stirring and boiling continued for a further 1 hour. The suspension is filtered and the solid well washed with cold water and then dried. The product is boiled with 200 parts of toluene, filtered at the boil and the toluene solution allowed to cool. The material which crystallises is filtered and again recrystallised from 150 parts of toluene to give 8 parts of a bright yellow powder (2-chloro-4-ethylamino-1:3:5-triazin-6-yl)pyrene, melting between 192 and 193° C. Similar results to those described in Example 1 are obtained when using this compound as a whitening agent.

*Example 6*

21 parts of (2:4-dichloro-1:3:5-triazin-6-yl)pyrene are stirred and boiled under reflux for 15 hours with 210 parts of acetone and 77.5 parts of 40% aqueous monomethylamine solution. The mixture is cooled and filtered and the solid washed on the filter first with cold water and then with cold methanol. After drying the crude product (18 parts) is recrystallised from 400 parts of o-dichlorobenzene to give 12 parts of a pale yellow crystalline powder, melting between 307 and 309° C. Similar results to those described in Example 1 are obtained when using this compound as a whitening agent.

*Example 7*

20 parts of [2:4-di($\beta$-hydroxyethylamino)-1:3:5-triazin-6-yl]pyrene, 11 parts of acetic anhydride and 20 parts of glacial acetic acid are heated for 2 hours at 100° C. The mixture is then poured into 100 parts of light petroleum and cooled to room temperature. The precipitated product is filtered, washed with petroleum ether and dried. It is purified by recrystallisation from benzene to give 14 parts of [2:4-di($\beta$-acetoxyethylamino)-1:3:5-triazin-6-yl]pyrene, a cream coloured powder, melting between 123 and 125° C. Similar results to those described in Example 1 are obtained when using this compound as a whitening agent.

*Example 8*

6.5 parts of sodium metal are dissolved at a temperature between 50 and 60° C. in 200 parts of ethylene glycol. To the solution are added 12 parts of (2:4-dichloro-1:3:5-triazin-6-yl)pyrene and the mixture is stirred and heated at 100° C. for 18 hours. It is then poured into 500 parts of cold water and the resulting solution acidified with acetic acid. The precipitated product is filtered, well washed with cold water and finally dried. 12 parts of [2:4-di($\beta$-hydroxyethoxy)-1:3:5-triazin-6-yl]pyrene, a canary yellow finely crystalline powder, melting with decomposition at 290° C., are obtained. This compound is a particularly effective whitening agent when applied by the methods described in Example 1.

*Example 9*

17.5 parts of (2:4-dichloro-1:3:5-triazin-6-yl)pyrene, 150 parts of benzene and 26.0 parts of morpholine are stirred and heated to boiling for 2 hours. The solution is filtered at the boil from a little impurity and the filtered solution diluted with 300 parts of light petroleum. The solid is filtered and washed successively with methanol and hot water, and then dried. It is purified by crystallisation from 50 parts of monochlorobenzene. 11 parts of [2:4-di(morpholino)-1:3:5-triazin-6-yl]pyrene, a pale yellow powder melting between 181 and 182° C. are obtained. Similar results to those described in Example 1 are obtained when using this compound as a whitening agent.

*Example 10*

35 parts of (2:4-dichloro-1:3:5-triazin-6-yl)pyrene, 300 parts of toluene and 61 parts of 2:6-dimethylaniline are stirred and heated for 12 hours at 100° C. The mixture is cooled and filtered and the solid washed on the filter with 250 parts of methanol and then with water and dried. It is purified by crystallisation from 500 parts of o-dichlorobenzene.

42 parts of [2:4-di(2':6'-dimethylphenylamino)-1:3:5-triazin-6-yl]-pyrene, an off-white crystalline powder melting at 317° C., and useful as a whitening agent are obtained.

*Example 11*

35 parts of (2:4-dichloro-1:3:5-triazin-6-yl)pyrene, 300 parts of toluene and 46.5 parts of aniline are stirred and heated 12 hours at 100° C. The mixture is cooled and filtered and the solid washed on the filter with methanol and then with water and finally dried. The crude product (40 parts) is warmed to 70° C.. with 200 parts of aniline, cooled to room temperature and filtered from an insoluble impurity. The filtered solution is poured into 1000 parts of methanol and allowed to stand overnight at room temperature. The solid which crystallises is filtered, washed well with methanol and dried. 34 parts of [2:4-di(phenylamino)-1:3:5-triazin-6-yl]-pyrene, a cream coloured powder melting between 200 and 201° C., are obtained. Similar results to those described in Example 1 are obtained when using this compound as a whitening agent.

*Example 12*

17.5 parts of (2:4-dichloro-1:3:5-triazin-6-yl)pyrene, 150 parts of toluene and 39 parts of di-isobutylamine are stirred and heated for 8 hours at 100° C. The hot solution is filtered from insoluble matter and the filtered solution evaporated to dryness in vacuo from a hot water bath. The residue is recrystallised from 75 parts of butanol. 17 parts of [2:4-(di-isobutylamino)-1:3:5-triazin-6-yl]pyrene, a fawn coloured crystalline powder, melting between 147 and 148° C., are obtained. Similar results to those described in Example 1 are obtained when using this compound as a whitening agent.

*Example 13*

35 parts of (2:4-dichloro-1:3:5-triazin-6-yl)pyrene and 250 parts of acetone are stirred and boiled under reflux and 26 parts of di-isobutylamine added dropwise over 30 minutes, after which boiling is continued for a further 2 hours. The suspension is filtered and the solid washed on the filter with acetone. The acetone filtrate and washings are diluted with cold water until no more solid is precipitated. The solid is filtered and purified by recrystallisation from acetone. 20 parts of [2-chloro-4-diisobutylamino-1:3:5-triazin-6-yl]pyrene, a bright yellow powder, melting between 107 and 108° C., are obtained. Similar results to those described in Example 1 are obtained when using this compound as a whitening agent.

*Example 14*

35 parts of (2:4-dichloro-1:3:5-triazin-6-yl)pyrene and 250 parts of acetone are stirred and boiled under reflux and 24.4 parts of 2:6-dimethylaniline are added dropwise over 2 hours after which boiling is continued for a further 2 hours. The suspension is filtered and the solid washed on the filter first with acetone and then with water. After drying it is purified by crystallisation twice from toluene. 14 parts of [2-chloro-4-(2':6'-dimethylphenyl)amino-1:3:5-triazin-6-yl]pyrene, a bright yellow crystalline powder, melting between 240 and 242° C., are obtained. Similar results to those described in Example 1 are obtained when using this compound as a whitening agent.

*Example 15*

8.0 parts of sodium metal are dissolved at a temperature between 20 and 50° C. in 300 parts of methanol. To the solution are added 35 parts of (2:4-dichloro-1:3:5-triazin-6-yl)pyrene and the mixture is stirred and boiled under reflux for 15 hours. The mixture is cooled and filtered and the solid washed on the filter first with water and then with methanol and then dried. It is purified by crystallisation from butanol.

17 parts of (2:4-dimethoxy-1:3:5-triazin-6-yl)pyrene, a yellow crystalline powder melting between 190 and 193° C. are obtained.

*Example 16*

20 parts of phenol and 25 parts of 32% caustic soda liquor are stirred with 300 parts of acetone, and 35 parts of (2:4-dichloro-1:3:5-triazin-6-yl)pyrene are then added and the mixture is stirred and boiled under reflux for 15 hours. The product is filtered and washed first with water and then with acetone, and finally dried. It is purified by recrystallisation from toluene to give 24 parts of (2:4-diphenoxy-1:3:5-triazin-6-yl)pyrene, a yellow crystalline powder melting between 189 and 192° C., useful as a whitening agent.

Example 17

10 parts of [2:4-di(β-hydroxyethylamino)1:3:5-triazine-6-yl]pyrene are added with stirring to 50 parts of 98% sulphuric acid and the mixture is heated at a temperature between 40 and 45° C. for 4 hours and then added dropwise to a stirred mixture of 60 parts of calcium carbonate and 400 parts of water. The mixture so obtained is filtered and the calcium sulphate washed on the filter with warm water. The filtrates are heated to 70° C. and made alkaline to Brilliant Yellow by addition of sodium carbonate. The solution is filtered from a little calcium carbonate and finally evaporated to dryness on a steam bath to give 16 parts of a monosulphonic acid of [2:4-di(β-hydroxyethylamino)-1:3:5-triazin-6-yl]pyrene.

Example 18

14 parts of sulphanilic acid are stirred with 250 parts of water and sufficient 32% aqueous sodium hydroxide is added to make the mixture just alkaline to Brilliant Yellow paper. 10 parts of (2:4-dichloro-1:3:5-triazin-6-yl)pyrene are added and the mixture stirred and boiled under reflux for 24 hours. 25 parts of sodium chloride are added and the mixture cooled to 20° C. The product is filtered and the solid re-dissolved in 1000 parts of boiling water. 10 parts of decolourising carbon are added and the solution again filtered and 70 parts of sodium chloride are added to the filtrate. The product is collected by filtration while still hot and dried.

10 parts of the disodium salt of [2:4-di-(4′-sulphophenylamino)1:3:5-triazin-6-yl]pyrene are obtained as a greenish-yellow powder useful as a whitening agent.

Example 19

1 part of (2:4-dimethoxy-1:3:5-triazin-6-yl)-pyrene (prepared as described in Example 15) is milled with 100 parts of water in presence of 0.2 part of the sodium salt of an alkylated naphthalene sulphonic acid for 16 hours. 1 part of polyethylene terephthalic fabric is impregnated with this suspension by passing through it and is then dried in an air oven at 180° C. for a period between 20 and 30 seconds.

The polyethylene terephthalate fabric so obtained is much whiter than untreated fabric.

Example 20

1.2 parts of sodium metal are dissolved in 100 parts of alcohol. To this solution are added 24.5 parts of (2:4-diphenoxy-1:3:5-triazin-6-yl)pyrene and the mixture is stirred and boiled under reflux for 15 hours. The mixture is poured into 250 parts of cold water and the precipitated solid is filtered off washed well with cold water, dried and then recrystallised from butanol.

12 parts of (2:4-diethoxy-1:3:5-triazin-6-yl)pyrene, a pale yellow crystalline powder, melting between 102 and 104° C. and useful as a whitening agent are obtained.

Example 21

1.2 parts of sodium metal are dissolved in 100 parts of n-propanol. To this solution are added 24.5 parts of (2:4-diphenoxy-1:3:5-triazin-6-yl)pyrene and the mixture is stirred and heated under reflux at 95–100° C. for 15 hours. The mixture is poured into 400 parts of cold water and the precipitated solid is filtered off, washed with cold water, dried and finally recrystallised from butanol.

9 parts of (2:4-di-n-propoxy-1:3:5-triazin-6-yl)pyrene, a pale cream coloured powder, melting at 108–110° C. and useful as a whitening agent are obtained.

Example 22

0.6 part of sodium metal are dissolved in 50 parts of butanol. To this solution are added 12 parts of (2:4-diphenoxy-1:3:5-triazin-6-yl)pyrene and the mixture is stirred and boiled under reflux for 15 hours.

The solution is poured into 700 parts of cold water and the precipitated solid is filtered off, washed with cold water and dried. It is finally recrystallised from butanol.

3 parts of (2:4-di-butoxy-1:3:5-triazin-6-yl)pyrene, a pale yellow powder melting at 236–238° C. and useful as a whitening agent are obtained.

Example 23

35 parts of (2:4-dichloro-1:3:5-triazin-6-yl)pyrene are dissolved in 500 parts of monochlorobenzene at 120° C. The solution is stirred at 120° C. and a solution of 2.3 parts sodium metal in 100 parts of methanol is added dropwise over 2 hours while allowing methanol to distil off. After stirring for a further 4 hours at 120° C. 5 parts of decolorising carbon are added and the mixture is filtered while hot. The filtrate is allowed to cool and crystallise. The product is filtered and dried to give 18 parts of crude (2-chloro-4-methoxy-1:3:5-triazin-6-yl)pyrene melting between 216° and 226° C. It is purified by extraction with boiling acetone, filtering from insoluble material and evaporating the extract to dryness. The residue from the evaporation is 7.5 parts of (2-chloro-4-methoxy-1:3:5-triazin-6-yl)pyrene melting between 222° and 230° C. which may be used as a whitening agent.

Example 24

10 parts of (2:4-dimethoxy-1:3:5-triazin-6-yl)pyrene are stirred at 50° C. with 150 parts of o-dichlorobenzene. To the solution is added over 30 minutes 4 parts of sulphuryl chloride. The temperature is then raised to 75° C. and held at 75° C. until no more hydrogen chloride is evolved.

The o-dichlorobenzene is removed by distillation and the product is filtered off, washed with methanol and dried. It is finally recrystallised from dimethylformamide.

4.5 parts of x-chloro-(2:4-dimethoxy-1:3:5-triazin-6-yl)pyrene, a pale yellow powder melting at 190–192° C. and useful as a whitening agent are obtained.

Example 25

2.3 parts of sodium metal are dissolved at a temperature between 20 and 50° C. in 100 parts of methanol. To the solution are added 16.3 parts of (2:4-dichloro-1:3:5-triazin-6-yl)anthracene and the mixture is stirred and boiled under reflux for 15 hours. The mixture is cooled and filtered and the solid washed on the filter first with water and then with methanol. It is purified by recrystallisation from butanol.

4 parts of (2:4-dimethoxy-1:3:5-triazin-6-yl)anthracene melting at 205–207° C. and useful as a whitening agent are obtained.

The (2:4-dichloro-1:3:5-triazin-6-yl)anthracene used in the above example is obtained as follows:

35.6 parts of anthracene and 37 parts of cyanuric chloride are dissolved in 250 parts of benzene and while stirring at a temperature between 20 and 25° C. 27 parts of anhydrous aluminium chloride are added over 1 hour after which stirring is continued at between 20–25° C. for 15 hours.

The mixture is filtered and the solid dried in a vacuum desiccator. The solid is then stirred with 500 parts of 10% aqueous hydrochloric acid at a temperature between 5 and 10% C. for 30 minutes, filtered again, washed with cold water and then dried at a temperature not exceeding 50° C. It is finally recrystallised from toluene.

21 parts of (2:4-dichloro-1:3:5-triazin-6-yl)anthracene melting between 201 and 207° C. are obtained.

Example 26

2.5 parts of sodium metal are dissolved at a temperature between 20 and 50° C. in 100 parts of methanol. To the solution are added 16 parts of (2:4-dichloro-1:3:5-triazin-6-yl)acenaphthene and the mixture stirred and boiled under reflux for 15 hours. The mixture is cooled and filtered and the solid washed on the filter first with water and then with methanol and then dried. It is recrystallised from toluene.

10 parts of (2:4-dimethoxy-1:3:5-triazin-6-yl)acenaphthene melting between 195 and 199° C. and useful as a whitening agent are obtained.

The (2:4-dichloro-1:3:5 - triazin - 6 - yl)acenaphthene used in the above example is obtained as follows:

31 parts of acenaphthene and 36 parts of cyanuric chloride are dissolved in 400 parts of benzene and while stirring at a temperature between 20° and 25° C. 40 parts of anhydrous aluminium chloride are added over 1 hour after which stirring is continued at between 20° and 25° C. for 15 hours.

The condensation mixture is poured into 500 parts of methanol and after stirring for 10 minutes is filtered and the solid washed on the filter with more methanol. The solid is stirred with 500 parts of 10% aqueous hydrochloric acid at a temperature between 5 and 10° C. for 30 minutes, filtered again and washed on the filter with ice cold water until acid-free. It is finally washed with methanol and dried at a temperature not exceeding 50° C. It is purified by recrystallisation from toluene.

The product is 26 parts of (2:4-dichloro-1:3:5-triazin-6-yl)acenaphthene melting at 199–201° C.

*Example 27*

2.0 parts of sodium metal are dissolved at a temperature between 20° and 50° C. in 60 parts of methanol. To the solution are added 5 parts of (2:4-dichloro-1:3:5-triazin-6-yl)chrysene and the mixture is stirred and boiled under reflux for 15 hours. It is cooled and filtered and the solid is washed on the filter first with water then with methanol and finally dried. 4.2 parts of (2.4-dimethoxy-1:3:5-triazin-6-yl)chrysene, a cream coloured crystalline powder melting at about 260° C. are obtained. It can be purified by recrystallisation from monochlorobenzene to give a cream coloured powder melting at 290° C. and useful as a whitening agent.

The (2:4-dichloro-1:3:5 - triazin - 6 - yl)chrysene used above is obtained as follows:

11.5 parts of chrysene and 9.3 parts of cyanuric chloride are dissolved in 100 parts of monochlorobenzene and while stirring at a temperature between 20 and 25° C. 7.0 parts of anhydrous aluminium chloride are added over 1 hour after which stirring is continued for a further 15 hours at between 20 and 25° C. 100 parts of petroleum ether are added and the dark coloured suspension is filtered and the solid washed on the filter with more petroleum ether. It is then dried in a vacuum desiccator. The solid is stirred with 150 parts of water and 50 parts of 36% aqueous hydrochloric acid at a temperature between 0 and 5° C. for 30 minutes, filtered and washed on the filter with ice cold water until acid-free. It is finally washed with methanol and then dried at a temperature not exceeding 80° C. 16 parts of (2:4-dichloro-1:3:5-triazin-6-yl)chrysene, a bright yellow powder having a melting point of about 200° C. are obtained. It can be purified by recrystallisation from toluene to give an orange-yellow crystalline powder melting at 239–241° C. and useful as a whitening agent.

What we claim is:

1. Triazine compound of the formula:

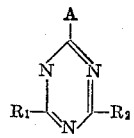

wherein A stands for a member selected from the group consisting of pyrene, anthracene, acenaphthene, and chrysene; $R_1$ stands for a member selected from the group consisting of chloro, monocyclic carbocyclicarylamino morpholino, lower alkyl amino, hydroxy lower alkyl amino, carboxylic acyloxy lower alkyl amino, sulfato lower alkyl amino, lower alkoxy, hydroxy lower alkoxy, monocyclic carbocyclic aryloxy, lower alkyl thio, and carboxy lower alkyl thio; and $R_2$ stands for a member selected from the group consisting of monocyclic carbocyclicarylamino morpholino, lower alkyl amino, hydroxy lower alkyl amino, carboxylic acyloxy lower alkyl amino, sulfato lower alkyl amino, lower alkoxy, hydroxy lower alkoxy, monocyclic carbocyclic aryloxy, lower alkyl thio, and carboxy lower alkyl thio.

2. 2-chloro-4-(β-hydroxyethylamino - 1:3:5 - triazin-6-yl)pyrene.
3. (2-chloro-4-ethylamino-1:3:5-triazin-6-yl)pyrene.
4. (2:4-dimethoxy-1:3:5-triazin-6-yl)pyrene.
5. (2-chloro-4-methoxy-1:3:5-triazin-6-yl)pyrene.
6. Monochloro-(2:4 - dimethoxy - 1:3:5 - triazin-6-yl)pyrene.

References Cited in the file of this patent
UNITED STATES PATENTS

| | | |
|---|---|---|
| 2,302,162 | Zerweck et al. | Nov. 17, 1942 |
| 2,325,803 | Schmidt et al. | Aug. 3, 1943 |
| 2,778,827 | Ackermann | Jan. 22, 1957 |
| 2,945,033 | Hausermann | July 12, 1960 |
| 2,956,898 | Fleck | Oct. 18, 1960 |
| 3,031,326 | Fleck | Apr. 24, 1962 |